(12) United States Patent  (10) Patent No.: US 6,342,027 B1
Suzuki  (45) Date of Patent: Jan. 29, 2002

(54) HYBRID MOTIVE POWER VEHICLE

(75) Inventor: Takeshi Suzuki, Shizuoka (JP)

(73) Assignee: Suzuki Motor Corporation, Shizuoka (JP)

( * ) Notice: Subject to any disclaimer, the term of this patent is extended or adjusted under 35 U.S.C. 154(b) by 3 days.

(21) Appl. No.: 09/588,469

(22) Filed: Jun. 6, 2000

(30) Foreign Application Priority Data

Jun. 28, 1999 (JP) ............................................. 11-181125

(51) Int. Cl.⁷ ............................. B60K 6/02; B60K 41/02
(52) U.S. Cl. .......................................................... 477/5
(58) Field of Search ............................................. 477/5

(56) References Cited

U.S. PATENT DOCUMENTS

| | | | |
|---|---|---|---|
| 2,803,975 A | * 8/1957 | Akerman et al. | 477/5 |
| 5,199,394 A | 4/1993 | Hartmann et al. | 123/179.1 |
| 5,887,670 A | 3/1999 | Tabata et al. | 180/65.2 |
| 5,982,045 A | * 11/1999 | Tabata et al. | 290/17 |
| 6,018,198 A | * 1/2000 | Tsuzuki et al. | 290/17 |
| 6,184,603 B1 | * 2/2001 | Hamai et al. | 477/3 |
| 6,203,468 B1 | * 3/2001 | Nitta et al. | 477/5 |
| 6,224,368 B1 | * 6/2001 | Ands et al. | 477/2 |

FOREIGN PATENT DOCUMENTS

| | | | |
|---|---|---|---|
| DE | 4039062 | 6/1992 | 123/179.1 |
| DE | 19720716 | 1/1998 | 180/65.2 |
| JP | 06-17727 | 1/1994 | |
| JP | 10212983 | 8/1998 | |

OTHER PUBLICATIONS

English Language Abstract of JP–06–17727.
English Language Abstract of JP–10–212983.

* cited by examiner

*Primary Examiner*—Sherry Estremsky
(74) *Attorney, Agent, or Firm*—Greenblum & Bernstein, P.L.C.

(57) ABSTRACT

The present invention provides a hybrid motive power vehicle capable of smooth switching from an electric motor to an internal combustion engine without torque fluctuation. A buffer clutch 5 is arranged in a power train system 3 common to the electric motor 1 and the internal combustion engine 2. When the power source is switched from the electric motor 1 to the internal combustion engine 2, the buffer clutch is set to a half-clutch state, so that an output torque fluctuation which may be generated at the upstream side of the power train system upon switching of the power source will not be transmitted to a differential gear 6 and drive wheels.

7 Claims, 4 Drawing Sheets

HYBRID MOTIVE POWER VEHICLE

BACKGROUND OF THE INVENTION

1. Field of the Invention

The present invention relates to an improvement of a hybrid motive power vehicle having an electric motor and an internal combustion engine and in more particular, to an improvement for suppressing a torque fluctuation caused in a power train system and in drive wheels when the power source is switched from one to the other.

2. Description of the Related Art

A hybrid motive power vehicle having an electric motor and an internal combustion engine as the power sources is already known, in which one or both of the power sources are activated for driving drive wheels.

In this type of hybrid motive power vehicle, switching from the electric motor to the internal combustion engine is performed by cranking (forcibly rotating) the internal combustion engine via a clutch. In this motive power switching, a torque fluctuation is generated in a motive power train system, which makes the vehicle running awkward.

This torque fluctuation includes a abrupt torque decrease generated at the initial stage of the start of the internal combustion engine when the electric motor which has been used only for running of the vehicle is used as a starter of the internal combustion engine, and a abrupt torque increase generated at the final stage of the start of the internal combustion engine when the internal combustion engine which has been functioning as a load of the electric motor starts rotation by itself.

In order to solve these problems, Japanese Patent Publication 6-17727 has suggested a hybrid type vehicle in which the drive torque of the electric motor is temporarily increased at the instant of clutch connection between the electric motor and the internal combustion engine, so as to prevent generation of the torque lowering. However, this does not solve the problem of the abrupt torque increase generated when the internal combustion engine has started.

Moreover, Japanese Patent Publication 10-212983 has suggested a motive power output apparatus which controls the ignition timing or the inlet valve open/close timing and the non-work fuel consumption, so as to suppress torque generated at the start of the internal combustion engine, preventing the abrupt torque increase. However, in order to suppress and control the torque, the structure of the internal combustion engine has become complicated, which increases the production cost.

SUMMARY OF THE INVENTION

It is therefore an object of the present invention to provide a hybrid motive power vehicle capable of smooth switching the power source from an electric motor to an internal combustion engine, realizing a stable running, using a simple configuration with solving the problems described above.

The hybrid motive power vehicle according to the present invention comprises: an electric motor and an internal combustion engine as power sources, so that at least one of the power sources is operated and its drive force is transmitted to drive wheels via a power train system common to the electric motor and the internal combustion engine; a power source switching unit for switching the power source between the electric motor and the internal combustion engine; a buffer clutch capable of adjusting a connection force and arranged in the power train system; and a clutch controller for maintaining the connection force of the buffer clutch in a half-clutch state while the power source switching unit is operating and setting the buffer clutch to a complete connection state when the operation of the power source switching unit is complete.

The power source switching unit selects a power source to be operated and switches the power source from the electric motor to the internal combustion engine, for example. While this switching is being performed, the clutch control means maintains the buffer clutch arranged in the power train system, in a half-clutch state. Accordingly, even if a torque fluctuation is generated in the vicinity of an output portion of the power source during a power source switching, the torque fluctuation is absorbed by slide of the buffer clutch in the half-clutch state. That is, the torque fluctuation will not be transmitted over the position of the buffer clutch to the downstream of the power train system. Thus, drive force fluctuation of the drive wheels is significantly reduced and it is possible to maintain a stable running while the power source switching is being performed.

Furthermore, in order to reduce the torque fluctuation itself generated in the vicinity of the output portion of the power source during a power source switching, the vehicle further comprises: a transmission arranged at an upstream position from the buffer clutch in the power train system and having an input shaft connected to an output shaft of the electric motor; and a start-up clutch capable of adjusting a connection force, through which clutch an output shaft of the electric motor is connected to an output shaft of the internal combustion engine, wherein the power source switching unit includes: a start-up condition setting block for setting a start-up control parameter for controlling an output of the internal combustion engine at starting the internal combustion engine, a stationary operation control parameter required for performing a stationary operation by the internal combustion engine alone, and a start-up condition block for setting a target rpm of the internal combustion engine required for reaching a running speed immediately before starting the power source switching; an internal combustion engine start-up control block for setting, in the internal combustion engine, the start-up control parameter set by the start-up condition setting block so as to increase the drive torque of the electric motor and connect the start-up clutch in the half-clutch state, so that the internal combustion engine is cranked by the electric motor so as to start the internal combustion engine; and a stationary operation start control block for confirming that the internal combustion engine is started and the internal combustion engine has reached the target rpm, returning the drive torque of the electric motor to a previous value, setting the start-up clutch to a complete connection state, setting, for the internal combustion engine, the stationary operation control parameter which has been set by the start-up condition setting block, and gradually reducing the torque application by the electric motor so as to start a drive by the internal combustion engine.

With this configuration, firstly, the clutch control means sets the buffer clutch to the half-clutch state. Next, the internal combustion start control block sets the start-up control parameter for the internal combustion engine, increases the drive torque of the electric motor, sets the start-up clutch to the half-clutch state, and connects the electric motor to the internal combustion engine. This starts a cranking of the internal combustion engine by the electric motor to increase the load of the electric motor. However, the drive torque of the electric motor has been increased and it is possible to prevent relative lowering of the output torque due to increase of the load. Moreover, the start-up clutch for transmitting the drive force of the electric motor to the internal combustion engine is in the half-clutch state. Accordingly, even if a torque fluctuation is generated when the electric motor is connected to the internal combustion engine, the fluctuation is very gentle and the substantial output torque is almost identical to the state when no load of the internal combustion engine affects the electric motor, i.e., the state before starting the cranking of the internal combustion engine.

Next, the internal combustion is started by the aforementioned cranking and the internal combustion engine starts spontaneous rotation, increasing its rpm, which is confirmed by the stationary operation start control block. However, combustion of the internal combustion engine at this stage is controlled according to the start-up control parameter set by the start-up condition setting block and accordingly, the output from the combustion is suppressed to a very low value. That is, the output at this stage substantially owes to rotation of the electric motor and the output torque, in the same way as has been described above, is almost identical to the state prior to starting crank and the value during the cranking of the internal combustion engine.

Next, when the rpm of the internal combustion engine has reached the target rpm set by the start-up condition setting block, this is detected by the stationary operation start control block. The drive torque setting of the electric motor is returned to a previous state, i.e., the state prior to starting the buffer clutch connection and the start-up clutch is set to a complete connection state so as to completely connect the electric motor to the internal combustion engine. At this stage, the internal combustion engine has reached the target rpm value, i.e., the rpm required for the speed immediately before switching the power source and this value is identical to the current rpm of the electric motor. That is, there is no difference between the internal combustion engine and the electric motor and no torque fluctuation is generated if the startup clutch is connected completely.

After the internal combustion engine is completely connected to the electric motor via the start-up clutch, the stationary operation start control block sets, for the internal combustion engine, the stationary operation control parameter enabling the internal combustion engine to operate solely, i.e., a parameter allowing a substantial torque output by the internal combustion engine and gradually reduces the torque application by the electric motor while starting drive by the internal combustion engine, so that the total of the output from the electric motor and the output from the internal combustion engine is almost identical, i.e., matched with the output of the electric motor immediately before starting connection of the start-up clutch.

The start-up control parameter for suppressing the output of the internal combustion engine at starting the internal combustion engine and the stationary combustion control parameter allowing a stationary operation of the internal combustion engine alone may utilize the fuel injection and ignition cycle, the throttle open degree, and the like.

For example, when using the fuel injection and ignition cycle of the internal combustion engine as a parameter, the setting for continuous fuel injection and ignition (for increasing the output torque) is the stationary operation control parameter and the setting for carrying out the fuel injection and ignition intermittently (for decreasing the output torque) is the start-up control parameter. Moreover, when using the throttle open degree as a parameter, the setting for increasing the throttle open degree within an appropriate range (for increasing the output torque) is the stationary operation control parameter and the setting for decreasing the throttle open degree (for decreasing the output torque) is the start-up control parameter. According to the configuration of the internal combustion engine, it is possible to adjust the ignition timing, the inlet valve open-close timing, the air/fuel ratio, or the like so as to control the output of the internal combustion engine.

BRIEF DESCRIPTION OF THE DRAWINGS

FIG. 2($b$) is a timing chart showing a throttle open degree change, assuming that the power source switching starts at t0; FIG. 2($c$) is a timing chart showing the rpm of the internal combustion engine, assuming that the power source switching starts at t0; FIG. 2($d$) is a timing chart showing a torque output change of the internal combustion engine, assuming that the power source switching start at t0; FIG. 2($e$) is a timing chart showing a start-up clutch connection force change, assuming that the power source switching starts at t0; FIG. 2($f$) is a timing chart showing a torque output change of the electric motor, assuming that the power source switching starts at t0; FIG. 2($g$) is a timing chart showing a buffer clutch connection force change, assuming that the power source switching starts at t0; and FIG. 2($h$) is a timing chart showing a final torque output change, assuming that the power source switching starts at t0.

DESCRIPTION OF THE PREFERRED EMBODIMENT

Figure 1:
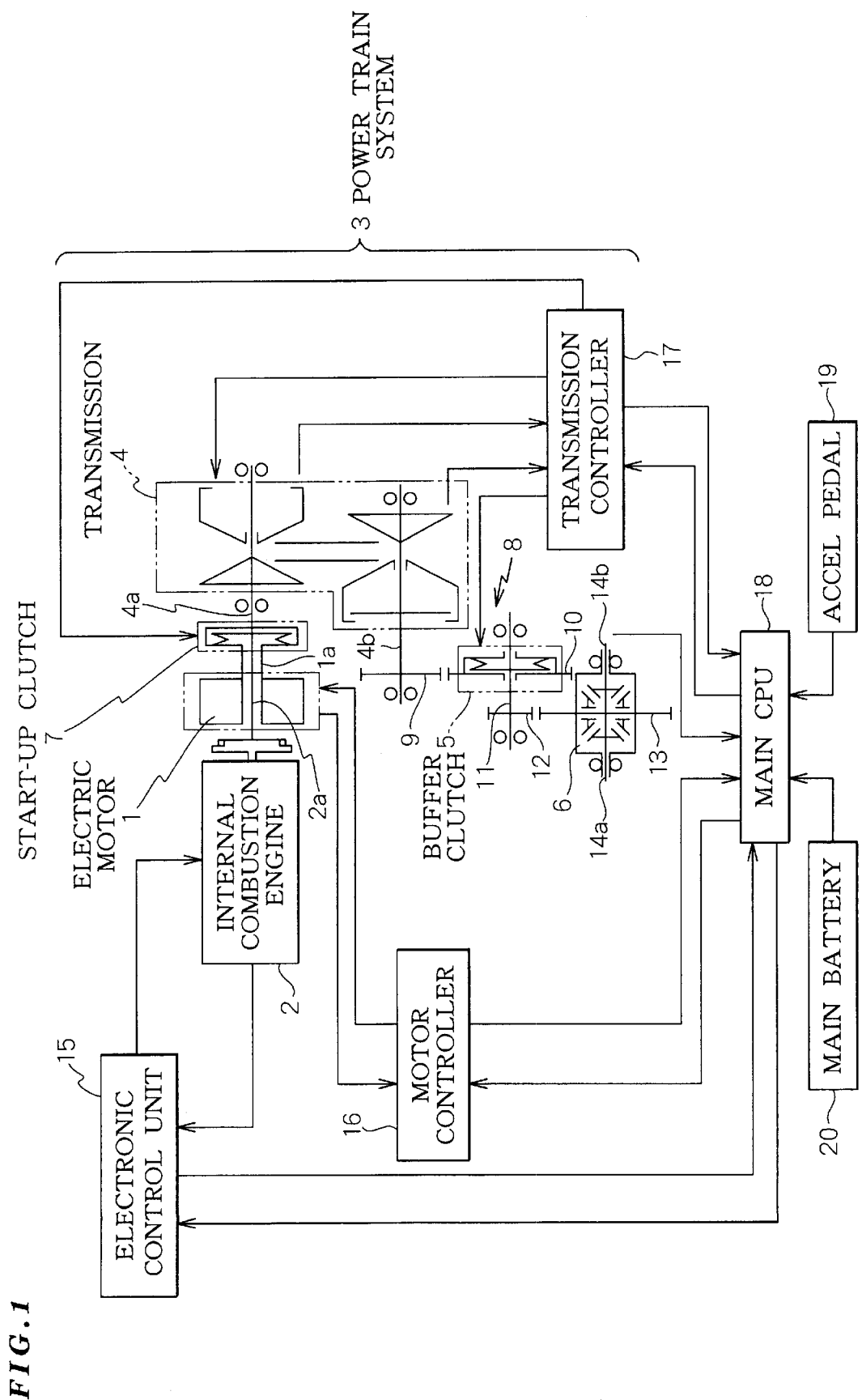
FIG. 1 is a conceptual view of an essential portion of a power system of a hybrid motive power vehicle according to an embodiment of the present invention.

Hereinafter, an explanation will be given on an embodiment of the present invention with reference to the attached drawings. FIG. 1 is a conceptual view showing an outline of an essential portion of a motive power block of a hybrid motive power vehicle according to an embodiment of the present invention.

The motive power block includes an electric motor 1, an internal combustion engine 2, and a power train system 3 common to the electric motor 1 and the internal combustion engine 2. The power train system 3 includes a transmission 4, a reduction gear 8, a buffer clutch 5, and a differential gear 6. In this embodiment, the transmission 4 is a belt-type variable automatic transmission, but it can also be a hydraulic type automatic transmission or manual transmission. As shown in FIG. 1, the transmission 4 is located at the upstream of the buffer clutch in the power train system 3.

The electric motor 1 has an output shaft 1$a$ which is regularly connected to an input shaft 4$a$ of the transmission 4 and during a travel of the vehicle, the output shaft 1$a$ of the electric motor 1 and its rotor are rotated. Moreover, the internal combustion engine 2 has an output shaft 2$a$ which is connected to the output shaft 1$a$ of the electric motor 1 via a start-up clutch 7 whose connection amount can be adjusted (slip controllable).

When only the electric motor 1 is to be used as the power source for running, the start-up clutch 7 is set into a completely unconnected state. Only the output shaft 1$a$ of the electric motor 1 is rotated to transmit the drive force to the input shaft 4a of the transmission 4 while the output shaft 2a of the internal combustion engine 2 is in a rotation stop state. Moreover, when the internal combustion engine 2 is to be used as the drive force for running, the start-up clutch 7 is brought into a completely connected state, so that the output shaft 2a of the internal combustion engine 2 and the output shaft 1a of the electric motor 1 are rotated as a unitary block so as to transmit the drive force to the input shaft 4a of the transmission 4. Here, the inertia of the rotor of the electric motor 1 functions as a load of the internal combustion engine 2.

On the other hand, an output gear 9 is fixed to the output shaft 4b of the transmission 4 and this output gear 9 is engaged with an input gear 10 of the reduction gear 8. The input gear 10 is connected to a shaft 11 of the reduction gear 8 via a buffer clutch whose connection force can be adjustable (slip-controllable). An output gear 12 is fixed to the shaft 11 of the reduction gear 8. This output gear 12 is engaged with an input gear 13 of the differential gear 6 so as to operate the differential gear 6 to drive the drive wheels attached to the output shafts 14a and 14b of the differential gear 6.

When the electric motor 1 or the internal combustion engine 2 is used as the power source for a stationary operation, the buffer clutch 5 is in a completely connected state and the rotation of the input gear 10 of the reduction gear 8 is transmitted as it is to the output gear 12 of the reduction gear 8. Moreover, when the power source for running is switched from the electric motor 1 to the internal combustion engine 2, the buffer clutch 5 is in a half-clutch state, allowing a slide between the input gear 10 and the output gear 12 of the reduction gear 8 constituting a part of the power train system 3.

The start-up clutch 7 and the buffer clutch 5 may be hydraulic type wet clutches, powder type clutches using magnetic powder, or ordinary dry clutches as long as the connection power can be adjusted.

The internal combustion engine 2 is controlled by an electronic control unit 15 instructing the throttle open degree, fuel injection and ignition timing, and the like. Moreover, a data such as rpm is fed back from the internal combustion engine 2 to the electronic control unit 15.

The electric motor 1 is controlled by a motor controller 16 instructing a drive torque, rpm, and the like. A data such as rpm is fed back from the electric motor 1 to the motor controller 16.

A transmission controller 17 detects rpm of the input shaft 4a and the output shaft 4b of the transmission 4 and controls the reduction ratio of the transmission 4 as the conventional functions, and has a function to control connection and disconnection between the start-up clutch 7 and the buffer clutch 5 and to adjust the connection force.

A main CPU 18 is a microprocessor to control the entire power system via the electronic control unit 15, the motor controller 16, and the transmission controller 17. The main CPU 18 reads in the operation amount of an accel pedal 19 as a torque instruction value and outputs various instructions to the electronic control unit 15, the motor controller 16, and the transmission controller 17.

The main CPU 18 can detect all the data passed between the electronic control unit 15 and the internal combustion engine 2, between the motor controller 16 and the electric motor 1, and between the transmission controller 17 and the transmission 4. Furthermore, the rpm of the output shafts 14a and 14b detected by a revolution counter provided in the differential gear 6, i.e., a value of the running speed is input to the main CPU 18. A battery capacity of a main battery 20 is also detected by the main CPU 18.

Among the aforementioned components, the start-up clutch 7 constitutes a main portion of the mechanical structure of the power source switching unit, whereas the transmission controller 17 and the main CPU 18 constitute a main portion of the clutch control means. Moreover, a start-up condition setting block and an internal combustion start control block constituting the control block of the power source switching unit and the stationary operation start control block are constituted by the main CPU 18.

Figure 3:
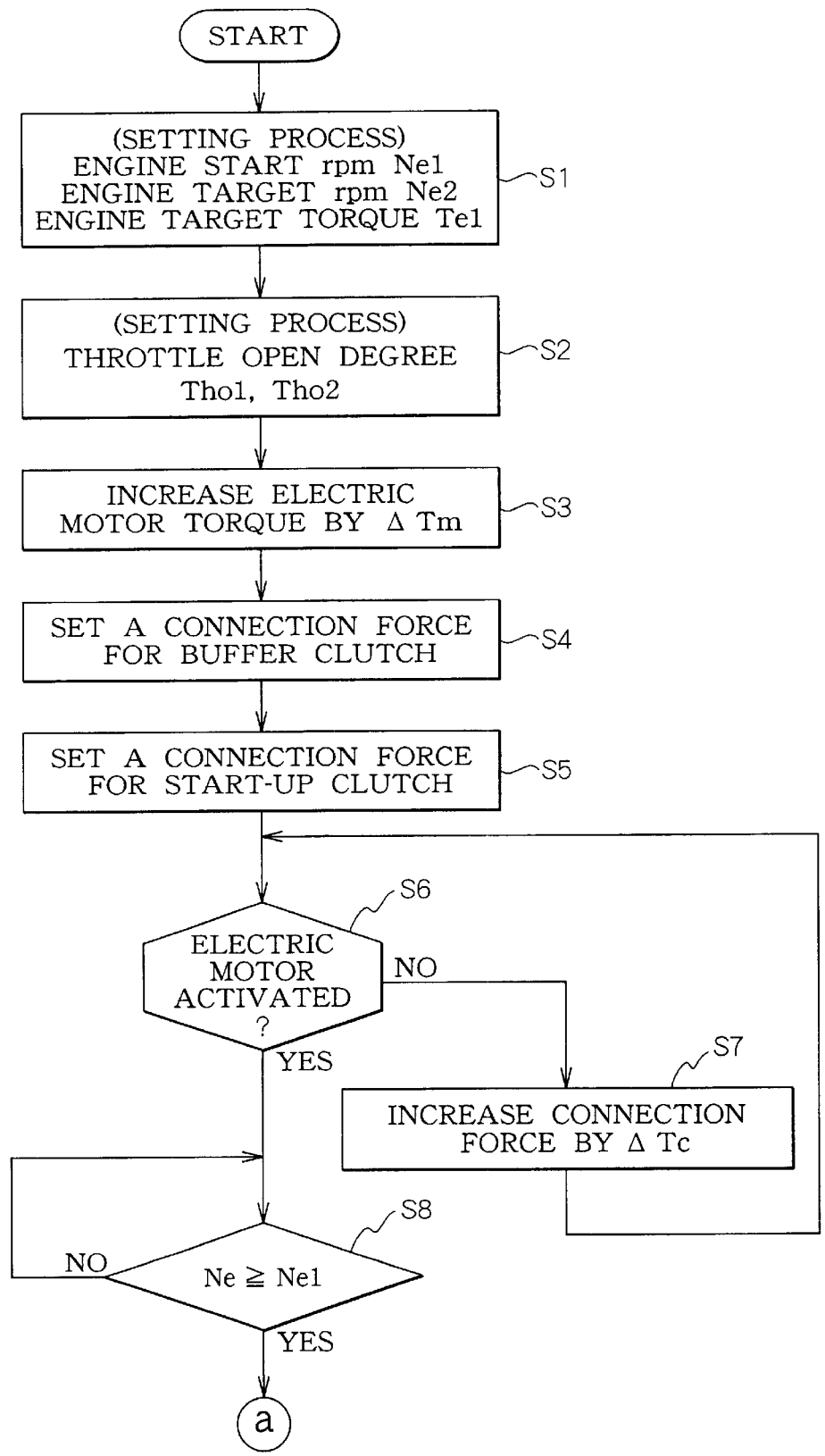
FIG. 3 is a flowchart showing an outline of the power source switching procedure.
Figure 4:
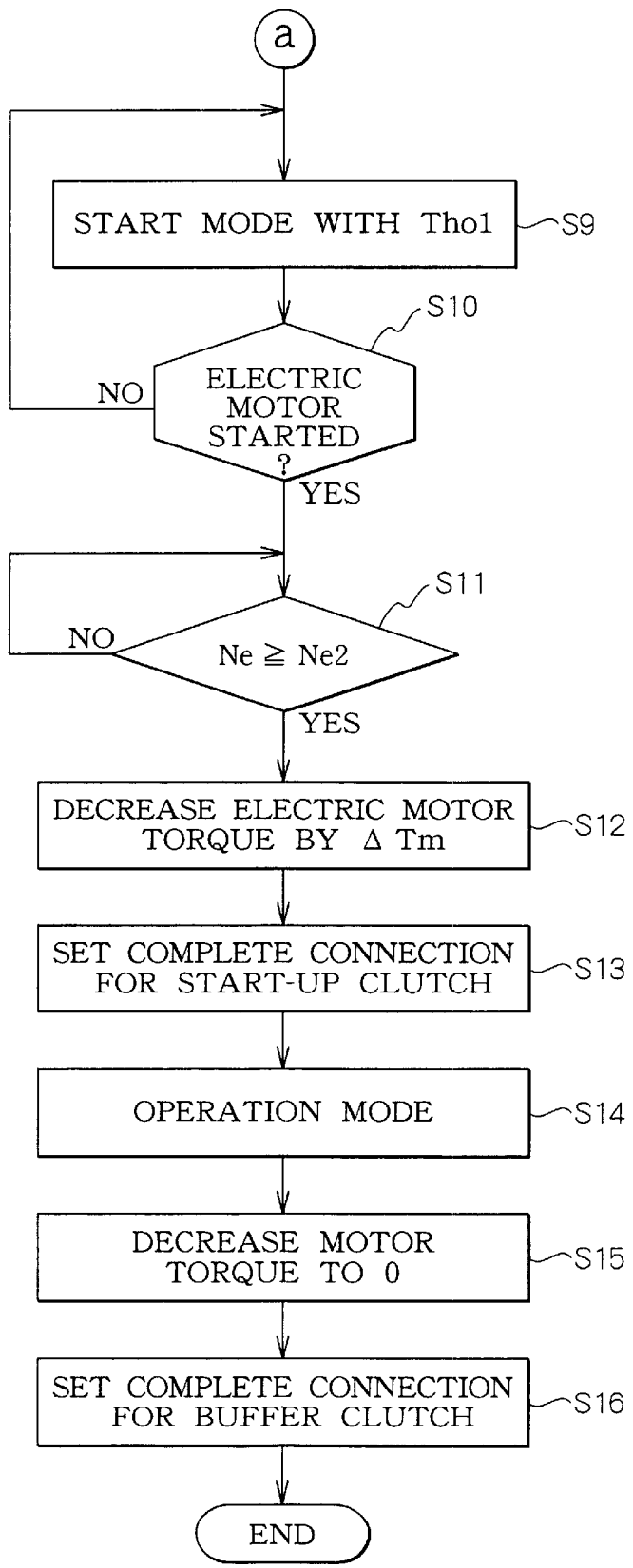
FIG. 4 is a continuation of the flowchart showing the outline of the power source switching procedure.

FIG. 3 and FIG. 4 are flowcharts showing an outline of a power source switching procedure carried out when the power source for running is switched from the electric motor 1 to the internal combustion engine 2. This procedure is automatically started by the main CPU 18 when the revolution meter of the differential gear 6 has detected a predetermined value of the vehicle running speed.

Figure 2:
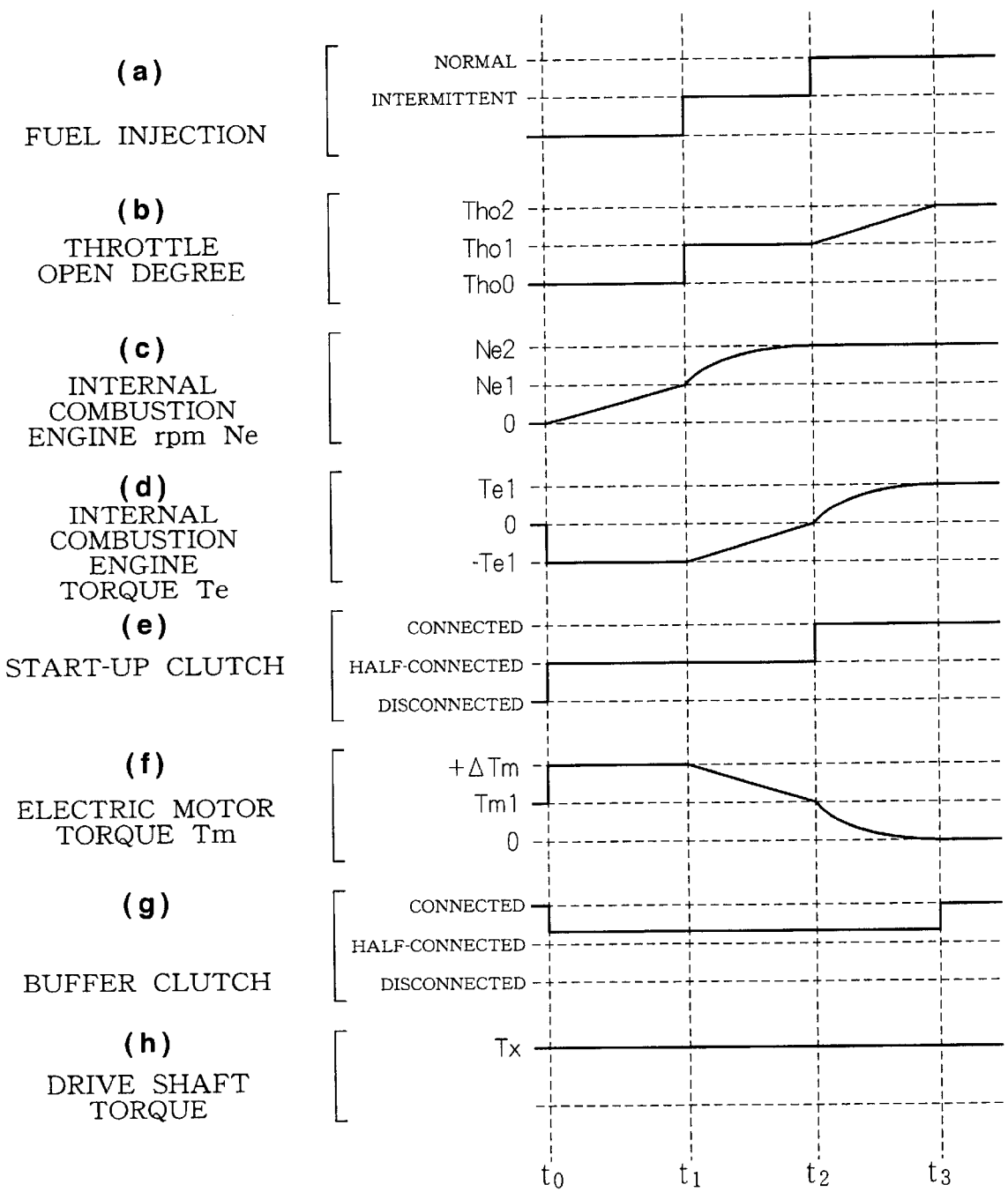
FIG. 2($a$) is a timing chart showing a fuel injection cycle change, assuming that the power source switching starts at t0.

Moreover, FIG. 2 shows the fuel injection and ignition in the internal combustion engine 2, the throttle open degree in the internal combustion engine 2, rpm of the internal combustion engine 2, the output torque of the internal combustion engine 2, connection state of the start-up clutch 7, the output torque of the electric motor 1, connection state of the buffer clutch 5, and the final drive shaft torque (output torque at the downstream from the shaft 11 of the reduction gear) in timing charts assuming t0 as the start point of the power source switching procedure.

Hereinafter, the power source switching procedure will be detailed with reference to the flowchart of FIG. 3 and FIG. 4 and the timing charts of FIG. 2.

Firstly, before t0 when the vehicle running speed reaches a predetermined value, only the electric motor 1 is used as the power source for running. As shown in FIG. 2, no fuel injection or ignition is present in the internal combustion engine 2 (FIG. 2(a)), and the throttle open degree of the internal combustion engine 2 is in a closed state of Tho0 (FIG. 2(b)). Moreover, the start-up clutch 7 is in a completely disconnected state (FIG. 2(e)), the internal combustion engine 2 is disconnected from the electric motor 1 and in a rotation stop state (FIG. 2(c)), and its output torque is 0 (FIG. 2(d)). On the other hand, the electric motor 1 rotates while maintaining the output torque of Tm1 which is required for driving the vehicle solely (FIG. 2(f)) and the buffer clutch 5 is in a completely connected state for transmitting the drive force of the electric motor 1 to the drive wheels (FIG. 2(g)). In this state, the shaft 11 of the reduction gear 8 finally outputs a torque Tx (FIG. 2(h)).

When the revolution counter of the differential gear 6 detects that the vehicle running speed has reached a predetermined value, the main CPU 18 starts the power source switching procedure shown in FIG. 3 and FIG. 4.

Firstly, the main CPU 18, after starting a power source switching procedure, make the electronic control unit 15 store the engine start rpm Ne1, the engine target rpm Ne2, and the engine target torque Te1 (step 1).

The engine start rpm Ne1 is a value of engine rpm appropriate for a forced start of the internal combustion engine 2 utilizing a crank. The engine target rpm Ne2 is a running speed immediately before starting the power source switching, i.e., the rpm of the internal combustion engine 2 required to reach the aforementioned predetermined running speed. The engine target torque Te1 is a value of torque output required to reach the aforementioned predetermined running speed with the output of the internal combustion engine 2 alone.

Next, the main CPU 18 makes the electronic control unit 15 store the throttle open degree Tho1 and Tho2 (step 2).

The throttle open degree Tho1 is a value of throttle open degree used at the start of the internal combustion engine 2, i.e., a value of the throttle open degree for suppressing the torque output to 0 or nearly 0 when the spontaneous rotation of the internal combustion engine 2 is started by the crank. Moreover, the throttle open degree Tho2 is a value of throttle open degree required for a stationary operation with the internal combustion engine 2 alone, i.e., a value of throttle open degree required for reaching the aforementioned predetermined running speed.

That is, the throttle open degree Tho1 is a start control parameter, and the throttle open degree Tho2 is a stationary operation control parameter. The start-up condition setting block in this embodiment is constituted by steps S1 and S2 by the main CPU 18.

Next, the main CPU 18 as the internal combustion start controller, prior to start of the actual power source switching, outputs a torque increase instruction to the motor controller 16 so as to increase the drive torque of the electric motor 1 from Tm1 to Tm1+ΔTm as shown at t0 in FIG. 2(*f*) (step S3). Moreover, the main CPU 18 as the clutch control means outputs a connection adjustment instruction corresponding to a half-clutch state to the buffer clutch 5 via the transmission controller 17, so that the buffer clutch 5 is in the half-clutch state as shown at t0 of FIG. 2(*g*) (step S4).

The drive torque of the electric motor 1 is increased so as to prevent decrease of the total output torque due to the load of the internal combustion engine 2 when it is connected to the electric motor 1. Moreover, the buffer clutch 5 is set to a half-clutch state so that a fluctuation of the total output torque and rotation speed due to connection between the internal combustion engine 2 and the electric motor 1 will not be transmitted to the drive wheels. There is no problem if the total output torque fluctuation is completely eliminated by increasing the drive torque of the electric motor 1 but actually such a solution is difficult. Accordingly, by setting the buffer clutch 5 to a half-clutch state, transmission of the fluctuation to the drive wheels at the power source switching is prevented.

Next, the main CPU 18 as the internal combustion start controller outputs a connection force adjustment instruction corresponding to the half-clutch state, to the start-up clutch 7 via the transmission controller 17. The connection force adjustment instruction sets the start-up clutch 7 to a half-clutch state as shown at t0 in FIG. 2 (*e*) (step S5), and determines according to a data from the electronic control unit 15 whether the internal combustion engine 2 is rotating or not, i.e., rotation of the electric motor 1 is properly transmitted to the internal combustion engine 2 via the start-up clutch 7 (step S6).

If the rotation of the internal combustion engine 2 is insufficient, the main CPU 18 gradually increases the connection force adjustment instruction to the start-up clutch (step S7) so that the rotation of the electric motor 1 is appropriately transmitted to the internal combustion engine 2.

At the interval from t0 to t1 in FIG. 2(*e*), the internal combustion engine 2 is appropriately rotated without increasing the connection force adjustment instruction to the start-up clutch 7. However, if the rotation of the electric motor 1 is insufficient and the process of step S7 is carried out repeatedly, this portion will be a straight line increasing to the upper right.

In this stage, as shown in FIG. 2(*a*) and FIG. 2(*b*), like in the running only by the electric motor 1, there is no fuel injection or ignition in the internal combustion engine 2, and the throttle open degree of the internal combustion engine 2 is in a closed state Tho0. Accordingly, even if the internal combustion engine 2 is cranked, combustion will not start. Only the rpm of the internal combustion engine 2 increases according to the connection time of the start-up clutch 7 as shown at the interval from t0 to t1 in FIG. 2(*c*). Moreover, since the internal combustion engine 2 is forced to rotated by the external force from the electric motor 1, its output torque is a negative value as shown at interval from t0 to t1 in FIG. 2(*d*). The electric motor 1 has an output torque maintained at the aforementioned value Tm1+ΔTm as shown at the interval from t0 to t1 in FIG. 2(*f*). The torque increase for the ΔTm in the electric motor 1 is absorbed by the crank operation of the internal combustion engine 2. Accordingly, the final output torque from the shaft 11 of the reduction gear 8 is maintained Tx as shown at the interval from t0 to t1 in FIG. 2(*h*).

When it is confirmed at the point t1 in Fin 2(*c*) that the rpm of the internal combustion engine 2 has reached the engine start rpm Ne1 appropriate for forced start (step S8), the electronic control unit 15 which has received an instruction from the main CPU 18 as the internal combustion start controller, as shown at t1 in FIG. 2(*a*) and FIG. 2 (*b*), sets the fuel injection and ignition at an intermittent cycle and the throttle open degree to Tho1 which is a start control parameter, and starts fuel injection and ignition (step S9).

The fuel injection and ignition cycle is also a control parameter. When this parameter is set intermittently, the parameter serves as a start control parameter for suppressing the output torque of the internal combustion engine 2. When this parameter is set normally, the parameter serves as a stationary operation control parameter for carrying out a stationary operation using the internal combustion engine 2 solely.

Next, the main CPU 18 as the stationary operation start controller determines whether the internal combustion engine 2 rotates spontaneously according to a load decrease of the electric motor 1 (step S10). If the internal combustion engine 2 is not started, the start processing of step S9 is continued so as to start the internal combustion engine 2.

When the internal combustion engine 2 starts rotation, the output torque of the internal combustion engine 2 is gradually increased as shown at the interval t1 to t2 in FIG. 2(*d*). There is no case of an abrupt output torque increase of the internal combustion engine 2 immediately after the start, e.g., in the vicinity of t1 in FIG. 2(*d*). This is because an excessive torque output of the internal combustion engine 2 is suppressed by setting the throttle open degree Tho1 and the intermittent fuel injection and ignition cycle which are start control parameters. Moreover, the rpm of the internal combustion engine 2 jumps up at time to in FIG. 2(*c*), but the start-up clutch 7 is maintained in the half-clutch state as shown at the interval from t1 to t2 in FIG. 2(*e*) and accordingly, the rotation fluctuation of the internal combustion engine 2 will not affect the rpm of the electric motor 1 or the final running speed or running torque. As shown at the interval from t1 to t2 in FIG. 2(*f*), the output torque of the electric motor 1 is gradually decreased according to the increase of the output torque of the internal combustion engine 2. This is because the internal combustion engine 2 starts spontaneous rotation and an external force functioning as a load to the electric motor 1 is gradually decreased. As a result, the output torque of the shaft 11 of the reduction gear which is a sum of the output torque values of the electric motor 1 and the internal combustion engine 2 is maintained at Tx as shown at the interval from t1 to t2 in FIG. 2(*h*).

When the current rpm Ne value of the internal combustion engine 2 has reached the engine target rpm Ne 2 required to realize a running speed immediately before starting switching the power source (step S11), the main CPU 18 as the stationary operation start controller outputs a torque decrease instruction to the motor controller 16 so as to return the drive torque of the electric motor 1 to the value Tm1 set before the crank start (step S12) and outputs a connection force adjustment instruction for a complete connection state with the start-up clutch 7 via the transmission controller 17, so that as shown at time t2 in FIG. 2(e), the electric motor 1 is in complete connection with the internal combustion engine 2 via the start-up clutch 7 (step S13).

At this point, the rpm of the internal combustion engine 2 has already reached the rpm of the electric motor 1 and there is no difference between the rpm of the power sources. Accordingly, even if the electric motor 1 is rapidly connected with the internal combustion engine 2, there will arise no rpm fluctuation or drive torque fluctuation. Moreover, since the internal combustion engine 2 is spontaneously rotating with an output torque almost 0, complete connection between the electric motor 1 and the internal combustion engine 2 will not cause a load of the internal combustion engine 2 on the electric motor 1. The drive torque required for the electric motor 1 is sufficient with the drive torque Tm1 required when the electric motor 1 solely drives the vehicle. As a result, the output torque from the shaft 11 of the reduction gear which is the sum of the output torque values of the electric motor 1 and the internal combustion engine 2 is maintained at Tx as shown in at point t2 in FIG. 2(h) in the same way as when the electric motor 1 is solely used as the drive source for running.

Next, in order to start operation of the internal combustion engine 2 as the power source, the main CPU 18 as the stationary operation start controller sets the fuel injection and ignition cycle to the normal cycle as shown at point t2 in FIG. 2(a), gradually increases, with the aid of the electronic control unit 15, the throttle open degree of the internal combustion engine 2 from the start-up control parameter Tho1 toward the stationary operation control parameter Tho2 as shown at the interval from t2 to t3 in FIG. 2(b), and gradually increases the output torque of the internal combustion engine 2 from 0 to the output torque Te1 required for the target running speed as shown at the interval from t2 to t3 in FIG. 2(d) (step S14).

Moreover, the main CPU 18 as the stationary operation start controller, cooperating with the aforementioned processing of the electronic control unit 15, in response to the increase of the output torque of the internal combustion engine 2, gradually reduces the output torque of the electric motor 1 from Tm1 toward 0 as shown at the interval from t2 to t3 in FIG. 2(f) (step S15), so that the output torque from the shaft 11 of the reduction gear which is a total output torque is maintained at Tx as shown at the interval from t2 to t3 in FIG. 2(h).

When the main CPU 18 has confirmed that the throttle open degree of the internal combustion engine 2 has reached Tho2 and it is possible to start the stationary operation with the internal combustion engine 2 solely as the power source, the main CPU 18 outputs a connection force adjustment instruction for complete connection state to the buffer clutch 5 via the transmission controller 17 so that as shown at the point t3 in FIG. 2(e), the input gear 10 of the reduction gear 8 is completely connected to the output gear 12 via the buffer clutch 5 (step S16), thus completing the power source switching process.

Operation after this is identical to the conventional operation in which the throttle open degree is controlled according to the push degree of the accel pedal 19.

As shown in FIG. 2, in this embodiment, when the power source is switched from the electric motor 1 to the internal combustion engine 2 for running, the fuel injection cycle and the throttle open degree of the internal combustion engine 2 and the torque adjustment of the electric motor 1 as well as the connection of the start-up clutch 7 for connecting the electric motor 1 to the internal connection engine 2 are all performed in the half-clutch state of the buffer clutch 5. Even if the total output torque as the sum of the output torque values of the electric motor 1 and the internal combustion engine 2 fluctuates while a process required for switching the power source is carried out, the output fluctuation is absorbed between the input gear 10 and the output gear 12 of the reduction gear 8 by the function of the buffer clutch 5 and accordingly, the output fluctuation will not affect the final output torque from the shaft 11 of the reduction gear.

Moreover, what is necessary is only to provide the buffer clutch 5 in the power train system 3 and to control the buffer clutch with binary control 5 between the complete connection state and the half-clutch state. Accordingly, there is no need of complicating the configuration or control. Moreover, when the transmission 4 is replaced by a manual transmission, the buffer clutch 5 is arranged at the down stream from the transmission. The speed change can be carried out with this buffer clutch 5 in the half-clutch state, so as to suppress the torque fluctuation generated at the down stream of the power train system 3, enabling to obtain stable running.

Furthermore, the problem of the total output torque lowering generated when the internal combustion engine 2 is connected to the electric motor 1 is solved by increasing the drive torque of the electric motor by $\Delta$Tm. Moreover, the total output toorque increase generated at starting the internal combustion engine 2 can be suppressed by the throttle open degree Tho1 as the start-up control parameter for suppressing the output torque of the internal combustion engine 2 and the intermittent fuel injection and ignition cycle. Accordingly, actually, there is almost no fluctuation in the total output torque as the sum of the output torque values of the electric motor 1 and the internal combustion engine 2. Together with the torque fluctuation absorption by the buffer clutch, the final output torque from the shaft 11 of the reduction gear can be maintained almost at the value Tx as shown in FIG. 2 (h).

As has been described above, this embodiment utilizes the throttle open degree and the fuel injection and ignition cycle as the start-up control parameter for suppressing the output torque at the start of the internal combustion engine and as the stationary operation control parameter for stationary operation. However, it is also possible to utilize the ignition timing, the inlet valve open-close timing, the air/fuel (A/F) mixture ratio, and the like as the start-up control parameter and the stationary operation control parameter.

For example, when adjusting the ignition timing and the inlet valve open-close timing as the parameters, the ignition timing and the inlet valve open-close timing at the delay angle within the burnable range is set as the start-up control parameter, and the appropriate position for the maximum combustion efficiency is set as the stationary operation control parameter. Moreover, when adjusting the air/fuel ratio as the parameter, a fuel injection amount of a predetermined lean ratio within a burnable range is set as the start-up control parameter and a fuel injection amount for the optimal air/fuel ratio is set as the stationary operation control parameter.

Thus, the most preferred embodiment suppresses the torque fluctuation itself generated in the vicinity of the output portion of the power source (upstream side of the power train system 3) and removes a slight torque fluctuation with the buffer clutch 5 arranged at the downstream side of the power train system 3. Practically, it is also possible to arrange the buffer clutch 5 at the downstream side of the power train system 3 for performing the half-clutch control, which alone can have a sufficient effect in practice, i.e., a sufficient effect for suppressing the torque fluctuation of the drive wheels during an actual running.

In the hybrid power vehicle according to the present invention, during a switching of the power source, the buffer clutch arranged in the power train system common to the electric motor and the internal combustion engine is maintained in the half-clutch state. Accordingly, even if a torque fluctuation is generated in the vicinity of the output portion of the power source, the torque fluctuation will not be transmitted over the buffer clutch position to the downstream side of the power train system. The drive force fluctuation of the drive wheels is significantly reduced, enabling to obtain a stable running.

Furthermore, when cranking the internal combustion engine by the electric motor, the drive torque of the electric motor is increased so as to prevent the total output torque lowering. On the other hand, when starting the internal combustion engine, a control parameter is set to suppress the output torque of the internal combustion engine so as to prevent an abrupt rise of the internal combustion engine. This significantly suppresses the torque fluctuation itself generated at the upstream side of the power train system when the power source is switched.

The multiplier effect of the aforementioned enables to stabilize the final output torque which has not been obtained conventionally by the torque control of the electric motor and the output control of the internal combustion engine. Thus, even during switching of the power source, it is possible obtain a remarkably smooth and stable running.

Especially in the configuration utilizing the fuel injection and ignition cycle or the throttle open degree as the control parameter for suppressing the output torque of the internal combustion engine, it is possible to easily suppress the torque fluctuation itself generated at the upstream side of the power train system without complicating the internal combustion engine itself.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 11-181125 (Filed on Jun. $28^{th}$, 1999) including specification, claims, drawings and summary are incorporated herein by reference in its entirety.

What is claimed is:

1. A hybrid motive power vehicle comprising:
   an electric motor and an internal combustion engine as power sources, so that at least one of the power sources is operated and its drive force is transmitted to drive wheels via a power train system common to the electric motor and the internal combustion engine;
   a power source switching unit for switching the power source between the electric motor and the internal combustion engine;
   a buffer clutch capable of adjusting a connection force and arranged in the power train system; and
   a clutch controller for maintaining said connection force of the buffer clutch in a half-clutch state while said power source switching unit is operating and setting the buffer clutch to a complete connection state when the operation of said power source switching unit is complete.

2. The hybrid motive power vehicle as claimed in claim 1, the vehicle further comprising:
   a transmission arranged at an upstream position from the buffer clutch in the power train system and having an input shaft connected to an output shaft of the electric motor; and
   a start-up clutch capable of adjusting a connection force, through which clutch an output shaft of the electric motor is connected to an output shaft of the internal combustion engine,
   said power source switching unit including:
      a start-up condition setting block for setting a start-up control parameter for controlling an output of the internal combustion engine at starting the internal combustion engine, a stationary operation control parameter required for performing a stationary operation by the internal combustion engine alone, and a target rpm of the internal combustion engine required for reaching a running speed immediately before starting the power source switching;
      an internal combustion engine start-up control block for setting, in the internal combustion engine, the start-up control parameter set by the start-up condition setting block so as to increase the drive torque of the electric motor and connect the start-up clutch in the half-clutch state, so that the internal combustion engine is cranked by the electric motor so as to start the internal combustion engine; and
      a stationary operation start control block for confirming that the internal combustion engine is started and the internal combustion engine has reached the target rpm, returning the drive torque of the electric motor to a previous value, setting the start-up clutch to a complete connection state, setting, for the internal combustion engine, the stationary operation control parameter which has been set by the start-up condition setting block, and gradually reducing the drive torque application by the electric motor so as to start a drive by the internal combustion engine.

3. A hybrid motive power vehicle as claimed in claim 2, wherein the start-up control parameter and the stationary operation control parameter are a fuel injection cycle and an ignition cycle.

4. A hybrid motive power vehicle as claimed in claim 2, wherein the start-up control parameter and the stationary operation control parameter are a throttle open degree.

5. A hybrid motive power vehicle as claimed in claim 2, wherein the start-up control parameter and the stationary operation control parameter are an ignition timing.

6. A hybrid motive power vehicle as claimed in claim 2, wherein the start-up control parameter and the stationary operation control parameter are an inlet valve open-close timing.

7. A hybrid motive power vehicle as claimed in claim 2, wherein the start-up control parameter and the stationary operation control parameter are an air/fuel ratio.

* * * * *